United States Patent
Swanson et al.

[11] Patent Number: 5,889,639
[45] Date of Patent: Mar. 30, 1999

[54] PLAIN CARBON STEEL SHUTTER FOR REMOVABLE DATA STORAGE CARTRIDGES

[75] Inventors: John W. Swanson, Mahtomedi; Cathleen M. Arsenault; Gregory A. Laska, both of Woodbury; Ronald L. Hilton, St. Paul, all of Minn.

[73] Assignee: Imation Corp., Oakdale, Mich.

[21] Appl. No.: 798,305

[22] Filed: Feb. 7, 1997

[51] Int. Cl.$^6$ .......................... G11B 23/033; G11B 33/14
[52] U.S. Cl. .......................... 360/133; 369/291; 156/256
[58] Field of Search .......................... 360/133; 369/291; 156/256

[56] References Cited

U.S. PATENT DOCUMENTS

| | | | |
|---|---|---|---|
| 4,051,066 | 9/1977 | Miksic et al. | 252/389 R |
| 4,275,835 | 6/1981 | Miksic et al. | 239/60 |
| 4,849,844 | 7/1989 | Kato | 360/133 |
| 5,021,913 | 6/1991 | Overland et al. | 360/133 |
| 5,139,700 | 8/1992 | Miksic et al. | 252/389.54 |
| 5,153,801 | 10/1992 | Ikebe et al. | 360/133 |
| 5,161,080 | 11/1992 | Funayama et al. | 360/133 |
| 5,209,869 | 5/1993 | Miksic et al. | 252/389.54 |
| 5,226,035 | 7/1993 | Kato et al. | 360/133 |
| 5,289,457 | 2/1994 | Akiyama | 360/133 |
| 5,308,708 | 5/1994 | Takeda et al. | 360/133 |
| 5,320,778 | 6/1994 | Miksic et al. | 252/389.54 |
| 5,332,525 | 7/1994 | Miksic et al. | 252/389.54 |
| 5,344,589 | 9/1994 | Miksic et al. | 252/392 |
| 5,393,457 | 2/1995 | Miksic et al. | 252/194 |
| 5,410,440 | 4/1995 | Ishitsuka | 360/133 |
| 5,422,187 | 6/1995 | Miksic et al. | 428/545 |
| 5,512,111 | 4/1996 | Tahara et al. | 360/133 |
| 5,527,606 | 6/1996 | Kikuchi | 360/133 |
| 5,547,520 | 8/1996 | Murakami et al. | 148/120 |

FOREIGN PATENT DOCUMENTS

| | | |
|---|---|---|
| 0 218 231 | 4/1987 | European Pat. Off. |
| 5-234303 | 9/1993 | Japan. |

*Primary Examiner*—Craig A. Renner
*Attorney, Agent, or Firm*—Eric D. Levinson

[57] ABSTRACT

A plain carbon steel shutter for a removable data storage device includes a primary coating thereon to improve its appearance, wear, durability and resistance to corrosion. In addition to the primary coating, the shutter also includes a vapor corrosion inhibitor to reduce corrosion caused by ambient moisture in the atmosphere. To increase stiffniess, the fillet radius of the bends in the shutter are increased.

23 Claims, 3 Drawing Sheets

PLAIN CARBON STEEL SHUTTER FOR REMOVABLE DATA STORAGE CARTRIDGES

FIELD OF THE INVENTION

The present invention relates to the field of shutters for removable data storage devices. More particularly, the present invention provides a removable data storage device having a shutter with a plain carbon steel core, a primary coating, and a vapor corrosion inhibiting layer.

BACKGROUND OF THE INVENTION

Many removable data storage devices are provided with a casing to protect the data storage media in the device from contamination and physical damage. Typically, the casing includes openings therein to allow access to the data storage media contained in the removable data storage device. The removable data storage device also often includes a shutter for covering the openings when the device is not in use, thereby offering some protection to the data storage media.

One common type of removable data storage devices comprise discs of polyester resin or the like having a magnetic layer on each side thereof forming the media on which information is recorded by a magnetic head. A magnetic data storage disc with a diameter of 3½ inches (8.9 cm) or less is known as a micro-floppy disc and will be referred to so herein. Generally, the micro-floppy disc is accommodated in a hard casing to form a removable data storage device.

The casing enclosing the media of a micro-floppy disc includes two oppositely positioned head window openings through which the media is exposed to allow the reading and writing of data on the media. To protect the data storage media when the disc is not positioned in a disc drive, a spring-biased shutter is provided that covers the head window openings. The design of the micro-floppy disc is subject to American National Standards Institute (ANSI) standard x3.171-1989 and equivalents (such as ISO/IEC 9529-1:1989 and European Computer Manufacturers Association ECMA/TC 19/87/21) to allow interchangeable use of micro-floppy discs in different micro-floppy disc drives, both of which may be manufactured by many different companies. As a result, the dimensions of the shutters for such discs do not typically vary significantly between manufacturers.

Shutters are typically manufactured of stainless steel, aluminum, or plastic. Although shutters manufactured from stainless steel are particularly resistant to corrosion and possess sufficient strength to resist permanent deformation during normal use, they are typically more expensive than, for example, aluminum or plastic shutters. As a result, plastic and aluminum shutters are more prevalent.

Aluminum shutters are typically anodized to enhance their stiffness and ability to resist corrosion. Although anodizing increases the stiffness of the shutters, even anodized aluminum shutters do not have the stiffness of stainless steel shutters. In addition, the anodized aluminum shutters will permanently deform sooner, i.e., with less deflection, than a stainless steel shutter with the same thickness. The low stiffness and permanent deformation can make aluminum shutters more susceptible to becoming lodged in a disc drive if the sides of the shutter become permanently deformed. Such deformation, where the sides of the shutter are splayed outward, can make removal of the micro-floppy disc from the drive difficult (with the possibility of damage to the disc and/or disc drive during removal of the disc).

Another problem with anodized aluminum shutters is that although the anodizing increases the stiffness of the aluminum, the anodizing can crack at the bends used to form the shutter as well as at the edges of the shutter (if it is stamped from a coil of anodized aluminum). The areas where the anodizing is cracked do not exhibit the enhanced stiffness of the anodized aluminum, but rather exhibit the lower stiffness of the underlying aluminum alone. As a result, the shutter is even more prone to permanent deformation and, in some cases, fracture along the bends formed in the aluminum shutter.

Although the use of plated steel has been discussed for shutters on micro-floppy discs, it is not typically used because of the susceptibility of plated steels to corrode at any voids in the plating, including cracks that develop when the shutters are formed, i.e., bent, to the desired shape, as well as at sheared edges. In addition, the plated steel shutters are also susceptible to scratches and other surface defects during transit and handling of the shutters as they are jostled against each other or storage trays. Although the cracks and other surface defects formed in the shutters are small, they provide the starting point for corrosion by exposing a portion of the underlying steel. In addition to degrading the aesthetic appearance of the micro-floppy disc (or other removable data storage device), the corrosion can weaken the shutter, thereby increasing the chance for permanent deformation of the shutter.

SUMMARY OF THE INVENTION

The present invention provides a plain carbon steel shutter for a removable data storage device. The shutter includes a primary coating thereon to improve its appearance, wear, durability and resistance to corrosion. In addition to the primary coating, the shutter also includes a vapor corrosion inhibitor to reduce corrosion caused by ambient moisture in the atmosphere.

One advantage of the plain carbon steel shutters according to the present invention is increased stiffness as compared to both anodized aluminum and stainless steel shutters, thereby reducing the chance of permanent deformation of the shutters. Another advantage of shutters according to the present invention as compared to plated steel shutters is the reduced corrosion of the shutters due to the vapor corrosion inhibiting layer.

In one aspect, the present invention provides a protective shutter for a data storage cartridge, for example, a micro-floppy disc. The shutter comprises a core of plain carbon steel; a primary coating on at least a portion of the core; and a vapor corrosion inhibiting layer on the primary coating. The vapor corrosion inhibiting layer will preferably comprise an amine and the primary coating will preferably be a metallic plating. The plain carbon steel preferably comprises a plain carbon steel having 0.2% or less carbon.

In another aspect, the present invention provides a method of manufacturing a protective shutter for a data storage cartridge comprising steps of forming a shutter of plain carbon steel; providing a primary coating on the shutter; and providing a vapor corrosion inhibiting layer on the primary coating. The vapor corrosion inhibiting layer can be applied in an aqueous solution, by vapor phase deposition, or combinations thereof.

These and other features and advantages of the present invention are described more completely in the detailed description of the invention below.

DETAILED DESCRIPTION OF THE INVENTION

The present invention provides a plain carbon steel shutter for a removable data storage device. The shutter includes a primary coating thereon to improve its appearance, wear, durability and resistance to corrosion. In addition to the primary coating, the shutter also includes a vapor corrosion inhibitor to reduce corrosion caused by ambient moisture in the atmosphere.

Although the description below refers primarily to shutters used in connection with micro-floppy discs, it should be understood that the shutters according to the present invention may also find application in any other removable data storage device such as other magnetic data storage discs, tape cartridges, mini discs, magneto-optical discs, CD-ROM discs, etc.

Figure 1:
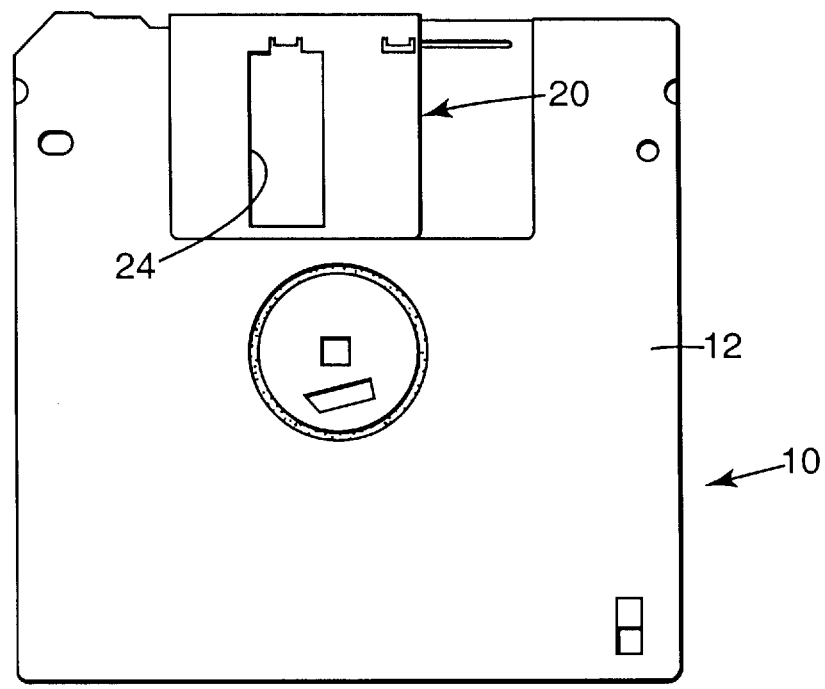
FIG. 1 is a plan view of a micro-floppy disc cartridge including a shutter according to the present invention.

FIG. 1 is a plan view of a micro-floppy data storage disc 10 including a casing 12 and shutter 20 according to the present invention. As discussed above, the general shape of the casing 12 and shutter 20 are dictated by the industry standards to ensure compatibility of the disc 10 with disc drives used to store and retrieve information on the data storage media in the disc 10. The shutter 20 is shown in the normal, biased position in which the openings (not shown) in the casing 12 are covered by the shutter 20.

Figure 2:
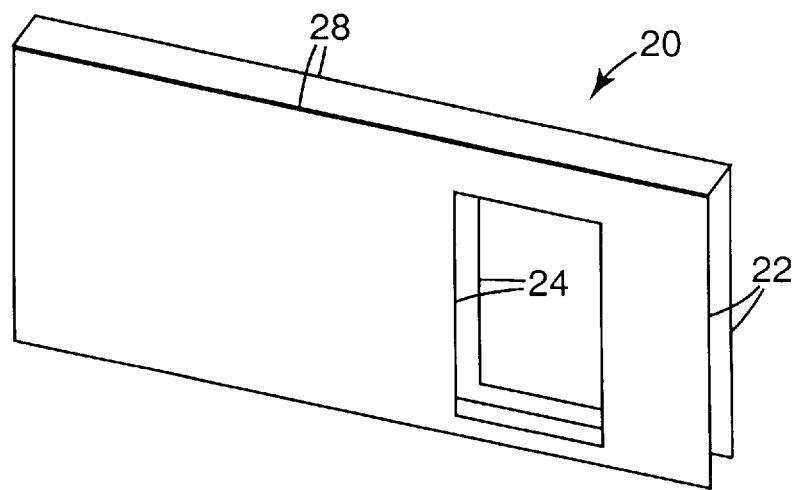
FIG. 2 is a perspective view of a micro-floppy disc shutter according to the present invention.

FIG. 2 is a perspective view of the shutter 20 according to the present invention. The shutter 20 includes two opposing sides 22, with each side 22 including an opening 24 located therein to provide access to the data storage media within the casing 12 (see FIG. 1) when the shutter 20 is retracted from its normal position, biased position. A minimum size for the openings 24 is set by the industry standards to ensure compatibility with standard micro-floppy disc drives. The sides 22 meet the end (sometimes referred to as the "bookend") of the shutter 20 at bends 28 that extend along the length of the shutter 20.

Figure 3:
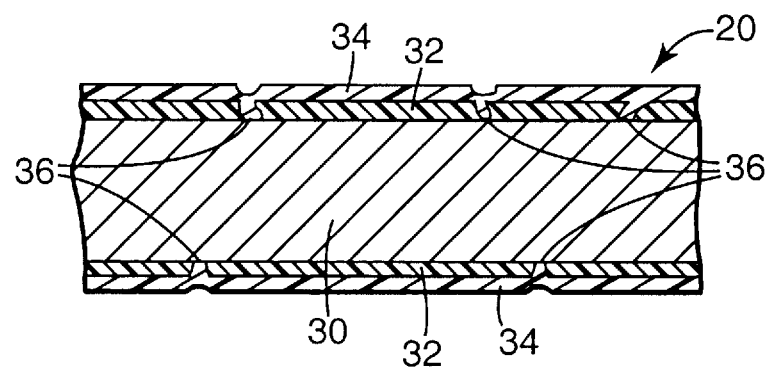
FIG. 3 is an enlarged partial cross-section of a shutter according to the present invention.

FIG. 3 is an enlarged partial cross-sectional view of a portion of the shutter 20. As shown, the shutter 20 includes a core 30, primary coating 32 and secondary coating 34 comprising a vapor corrosion inhibitor as described more fully below.

The core 30 of the shutter 20 preferably comprises a plain carbon steel. As used herein, the term "plain carbon steel" does not include steels with significant alloying components (such as stainless steels). Preferably, plain carbon steels according to the present invention have about 0.5% carbon content or less (although it will be understood that the plain carbon steels must include at least some carbon). More preferably, shutters according to the present invention are manufactured with plain carbon steel having about 0.2% carbon content or less. Examples of suitable plain carbon steels include, but are not limited to: AISI/SAE 1008, 1010, 1018 and 1020 steels. It is also preferred that the shutters be formed of cold-rolled plain carbon steel because of its strength and hardness. One particularly preferred plain carbon steel for shutter manufactured according to the present invention is AISI/SAE 1008 cold rolled plain carbon steel with DR9 Temper (1ST scale) (referred to below as 1008 DR9 plain carbon steel).

Figure 4:
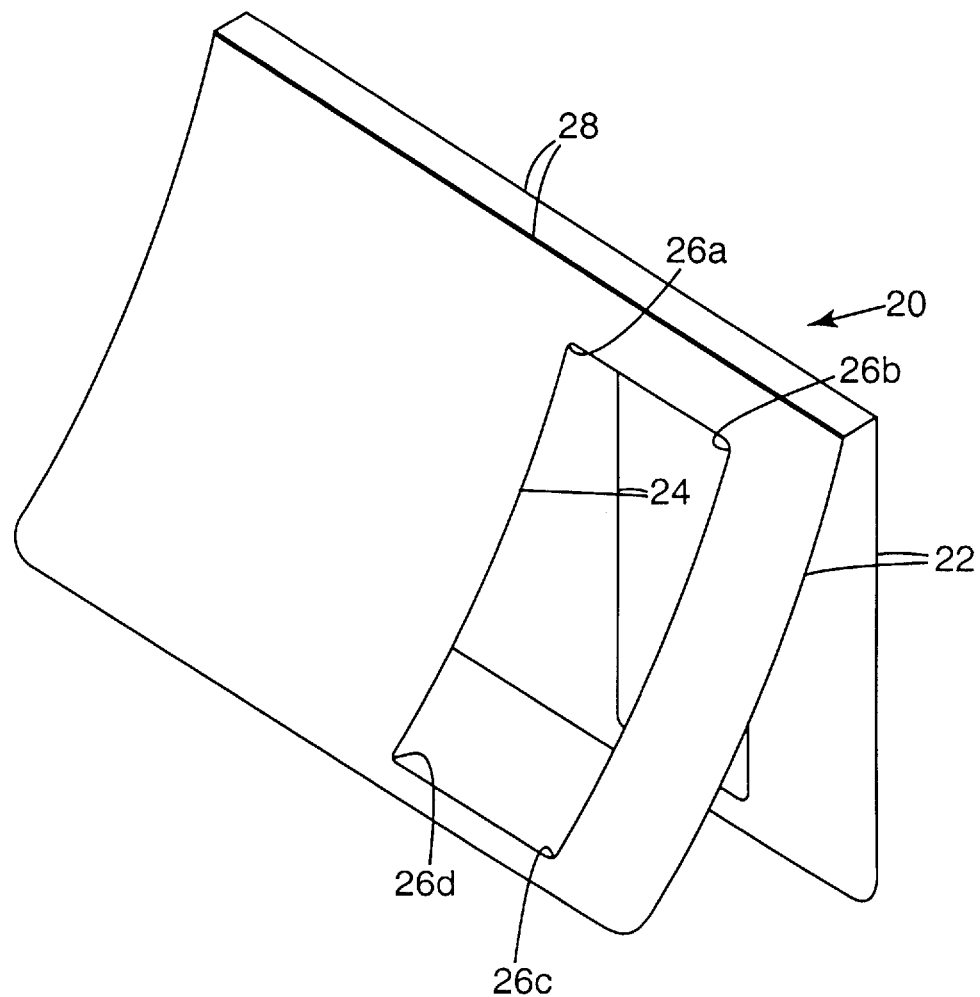
FIG. 4 is a perspective view of the shutter of FIG. 2 being deformed.

The use of plain carbon steels for shutters provides a number of advantages including lower cost (as compared to stainless steel). In addition, shutters formed from sheets of 1008 DR9 plain carbon steel having sides with the same thickness as those manufactured from 304 stainless steel can exhibit greater stiffness than a stainless steel shutter, thus requiring a larger force to displace or open the shutter, i.e., force the sides 22 of, for example, a micro-floppy disc cartridge shutter 20 apart as shown in FIG. 4. Furthermore, this stiffness is significantly greater than that provided by anodized aluminum shutters. The increased stiffness translates to increased resistance to deformation during use of a shutter 20 manufactured according to the present invention.

One potential drawback of using 1008 DR9 plain carbon steel for shutters is that the displacement point, or yield point, at which the deformation of the shutter will result in permanent deformation is generally lower for the plain carbon steel shutter than for an equivalent stainless steel shutter. In other words, a plain carbon steel shutter may deform when a side is displaced a distance of, for example, 0.4 inches (10.2 mm), while a stainless steel shutter with equivalent thickness may not permanently deform until its side is displaced 0.5 inches (12.7 mm). This drawback can, however, be reduced by adjusting the shape of the shutter to reduce areas of stress concentration in the typical design of a micro-floppy disc cartridge shutter.

Referring to FIG. 4, a shutter 20 designed for use on a micro-floppy disc cartridge includes an opening 24 in each side 22 in which the bends 28 extending the length of the shutter 20 are formed with a larger fillet radius than is typically used for the bends 28. A typical fillet radius for the bends 28 is about 0.02 inches (0.5 mm). By increasing the fillet radius to, for example, about 0.04 inches (1.0 mm) or more, the stress concentration at the corners 26a, 26b, 26c, 26d of the shutter 20 can be significantly reduced. The reduced stress concentration at the corners 26a, 26b, 26c, 26d of the shutter 20 increases the allowable displacement of the shutter sides 22 before permanent or plastic deformation occurs.

Wear resistance and corrosion of plain carbon steels are both a greater concern than with aluminum, plastic, or stainless steel used for shutters and -the primary coating 32 on the plain carbon steel core 30 assists in resisting corrosion. Suitable primary coatings will exhibit the desired wear resistance and durability needed for shutters on removable data storage devices, such as microfloppy discs, that are inserted into and removed from disc drives numerous times over their useful life. The primary coating 32 may be provided over the entire shutter 20 or over portions thereof.

Examples of suitable primary coatings 32 include metals and paints. Some desirable metallic coatings include tin, nickel, zinc, chrome, and combinations thereof. Typically, metallic coatings 32 will be electro-plated onto the plain carbon steel core 30, either before the shutters 20 are formed from sheet material or, alternatively, after the shutters 20 have been formed. The metallic coatings 32 can have either bright or matte finishes.

One preferred shutter 20 includes a primary coating 32 of tin (7C Brite Finish) with a thickness of about 15 microinches (0.25 pounds/base box or 0.38 micrometers) on a core 30 of AISI/SAE 1008 DR9. The thickness of the shutter 20 including plating is about 0.006 inches (0.15 millimeters).

Suitable material having these specifications is available from U.S. Can Metal Services Company (Chicago, Illinois). The desired plated cold-rolled steel has a 7C Brite finish.

Some examples of suitable non-metallic materials for primary coating 32 include epoxies, epoxy-urethanes, phenolic resins, organic paints, enamels, lacquers, plastic dip coatings, and combinations thereof. These materials can be applied by spray coating, roll coating, dip coating, or any other suitable process.

Although only one primary coating 32 will typically be applied to the core 30, it will be understood that two or more coatings may be applied to form the desired primary coating 32. These coatings may be applied over each other, i.e., a multi-layer coating, and/or on different portions of the shutter 20. For example, it may be desirable to apply a less expensive coating on the inside surface of the shutter 20 that is hidden from view in a typical micro-floppy disc. The side of the shutter 20 that is exposed during handling and use could be coated with a different coating that enhances appearance, wear resistance, corrosion resistance or a number of other factors.

Although the primary coating 32 provides a measure of protection against wear and corrosion, shutters 20 manufactured of plain carbon steel remain particularly susceptible to corrosion caused by ambient moisture levels. The materials used for primary coating 32 may be susceptible to cracking, crazing and other surface defects 36 depicted in FIG. 3. Defects 36 can expose the plain carbon steel core 30 to ambient moisture and those exposed areas of the core 30 may be corroded, thereby degrading the appearance and potentially affecting performance of the shutter 20. It is important to note that the size of the defects 36 may be relatively small and may not typically be noticed by a user. The corrosion that may begin in the defects 36 could, however, enlarge over time and/or cause partial delamination of the primary coating 32 from the core 30, thereby causing the defect 36 to become more visible over time.

The defects 36 may have a number of causes, but one typical cause with metallic plated shutters such as shutter 20 is during stamping and forming of the shutter 20 from a larger sheet of plated carbon steel. Stamping and forming shutters from pre-plated sheets of plain carbon steel is one economical method of manufacturing the shutters. One potential disadvantage, however, is the creation of surface defects 36 in shutters 20 during stamping and forming, particularly in the areas being deformed such as around the bends 28 at the top edge of each of the sides 22 of shutter 20 (see FIG. 2). Other areas susceptible to surface defects during stamping include the sheared edges of the openings 24. Similar problems may be expected if the primary coating 32 were a non-metallic material applied to the sheets of plain carbon steel before the shutters 20 were stamped and formed.

In addition to stamping, however, the surface defects 36 may also occur as a result of a substandard plating or coating process that results in voids or pinholes in the coating. These defects could occur even if the shutters 20 were coated after stamping and forming. Furthermore, the surface defects 36 may also be caused during transportation and handling of the shutters, particularly if the shutters 20 are placed in bags or other containers in which they are unrestrained. The jostling and movement caused by transporting and handling the shutters can cause the formation of surface defects 36 such as scratches anywhere on the shutters 20.

Corrosion at surface defects 36 in shutters 20 according to the present invention can, however, be reduced if a vapor corrosion inhibiting layer 34 is applied to the shutters 20 over the primary coating 32. The vapor corrosion inhibitor can prevent ambient moisture vapor from contacting the exposed areas of the core 30 in the areas of surface defects 36 as seen in FIG. 3 by forming a generally conformal layer 34 of a vapor corrosion inhibiting material that can be deposited in the surface defects 36.

It will be understood that, as used in connection with the present invention, "corrosion" will refer either only to oxidation or at least primarily to oxidation of the plain carbon steel core. The oxidation rate of the exposed portions of the ferrous plain carbon steel core is increased by ambient moisture. The vapor corrosion inhibiting layer of the present invention will reduce the rate of oxidation and, in some cases, may effectively eliminate the corrosion when viewed in light of the useful life of the removable data storage devices incorporating these shutters.

The materials used for the vapor corrosion inhibiting layer 34 are preferably capable of inhibiting both anodic and cathodic attack upon the plain carbon steels used for the core 30 of shutters 20 according to the present invention. It is preferred that the vapor corrosion inhibiting layer 34 include one or more amines in addition to other components such film formers, surfactants, waxes, etc. Representative examples of such coatings and methods of providing them are described, for example, in U.S. Pat. Nos. 4,051,066; 4,275,835; 5,139,700; 5,209,869; 5,320,778; 5,344,589; 5,332,525; 5,393,457; and 5,422,187; which are hereby incorporated by reference.

The thickness of vapor corrosion inhibiting layer 34 may vary, although the nominal thickness of the layer 34 is preferably about 30 to about 40 Å (as measured by Ion Scattering Spectroscopy (ISS) or Secondary Ion Mass Spectroscopy (SIMS)). It is preferred that the vapor corrosion inhibiting layer 34 be thin enough to avoid detection by the ordinary user, i.e., the layer 34 should not be visible to the naked eye nor should it be particularly noticeable during handling of the shutter 20 during normal use. In other words, the layer 34 should not cause the shutters 20 to appear or feel oily or greasy in normal use.

Although the vapor corrosion inhibiting layer 34 could be applied by a number of methods including liquid immersion/spraying, vapor phase deposition, or a combination of both liquid immersion/spraying and vapor phase deposition.

In one preferred vapor phase deposition process, the amine corrosion inhibitors used for the vapor corrosion inhibiting layer 34 are preferably deposited in a passive vapor deposition process in which the shutters 20 are placed in enclosures in which the corrosion inhibitor is located in a desiccant, another carrier, or in the packaging materials themselves as recited in a number of the patents listed above. Because the corrosion inhibitors vaporize under standard atmospheric conditions, they are deposited in vapor phase, on the surface of the shutters 20 during the time the shutters are present in the enclosure. It is preferred that the vapor phase deposition process be carried out for at least 24 hours to ensure adequate vapor phase deposition.

In one preferred liquid deposition process, the shutters can be immersed in a solution containing the vapor corrosion inhibiting materials (preferably one or more amines) after which they are dried. The solution may also include other components such as surfactants, film formers, waxes, etc. to assist in forming the vapor corrosion inhibiting layer 34.

Where the shutters with the vapor corrosion inhibiting layer are to be used in magnetic data storage devices such as micro-floppy discs, it is preferred that the vapor corrosion inhibiting layer be provided on the shutters before the disc is assembled to avoid exposing and/or coating the media with the vapor corrosion inhibiting layer.

Tests performed on some representative plated steels that can be used for shutters according to the present invention show significant improvements in resistance to corrosion. Some test results are depicted graphically in FIG. 5 and the test methods used to achieve those results are described in the example below. Briefly, however, the shutters 20 including a vapor corrosion inhibiting layer 34 show significant improvements in corrosion resistance.

EXAMPLE

Features and advantages of coated plain carbon steel shutters according to the present invention are further illustrated in this example. It is recognized, however, that while this example serves this purpose, the particular plain carbon steels and coating used, as well as other conditions and details, are not to be construed in a manner that would unduly limit the scope of this invention.

Sheet stock of AISI/SAE 1008 steel was purchased from U.S. Can Metal Services (Chicago, Ill.) as 1008 Cold Rolled Steel, 0.0118±0.0006 inches thick (107 pound/base box ±5% or 300±3.2 micrometers), T5 Temper (30T scale). The sheet stock was pre-plated (i.e., plated before delivery) with a bright tin coating, specified as 0.25 pound/base box Brite 7C Tin Plate (0.11 pound/base box minimum per side). The sheet stock was stamped to form hubs used for micro-floppy discs. It was theorized that performance of the materials when stamped to form shutters would be similar to hubs as both parts include bends and sheered edges that could be susceptible to cracking and degradation of the primary coating. As a result, the test results are believed to applicable to determine the effect of the vapor corrosion inhibiting layer on the materials, whether used for hubs or shutters.

Some of the parts were retained as controls (i.e., not treated with a vapor corrosion inhibitor), while others were treated with a corrosion inhibitor according to the following methods.

Group 1:

A first group (designated Group 1) were prepared by liquid immersion and vapor phase deposition of vapor corrosion inhibiting layer as follows.

Aqueous solutions of a vapor corrosion inhibitor (VCI) material were provided in concentrations ranging from 0.5% to 2% (by weight). The vapor corrosion inhibitor was VCI-379 purchased from Cortec Corporation, White Bear Lake, Minn. In addition to the amine vapor corrosion inhibitor, the VCI-379 also includes suitable film formers, surfactants, waxes, and other components required to assist in depositing a vapor corrosion inhibiting layer including an amine.

Freshly stamped parts as described above were cleaned by aqueous washing in which the parts were immersed in a high pH (about 8.5 to about 10) aqueous detergent solution that was heated to 140±5° F. (60±3° C.). The parts were agitated in the detergent solution for 2–4 minutes after which the parts were immersed in a heated rinse water tank (140±5° F. or 60±3° C.) and agitated for 2–4 minutes. Alternatively, the parts could be cleaned in a heated solution of trichloroethylene.

The cleaned parts were then immersed and agitated for 1–3 minutes in the aqueous solution including the vapor corrosion inhibitor material. After being removed from the vapor corrosion inhibitor solution, the parts were air dried in an oven at 210±10° F. (99±5° C.) for 15–20 minutes after which they were allowed to cool to room temperature.

The parts were then packaged in plastic bags formed with a vapor corrosion inhibitor in the packaging material. The material used for the bags was VCI-126, available from Cortec Corporation. Also inserted into each bag was a vapor phase emitter containing an active amine that vaporizes at standard atmospheric conditions. The vapor phase emitter pouches used were designated 1-MUL, also available from Cortec Corporation.

The parts were retained in the bags for at least 24 hours after which they were removed for testing. The results of tests on this group of parts is depicted in Table 1 below as Group 1 along with the variables used in developing the Eyring Acceleration Model used to arrive at the expected survival rate.

Group 2:

A second group of the parts (designated as Group 2) was subjected only to vapor phase deposition of the vapor corrosion inhibitor as discussed below.

Freshly stamped parts as described above were cleaned by aqueous washing as described above for Group 1. The cleaned parts were then dried and placed in plastic bags formed with a vapor corrosion inhibitor in the packaging material. The material used for the bags was VCI-126, available from Cortec Corporation. Also inserted into each bag was a vapor phase emitter containing an active amine that vaporizes at standard atmospheric conditions. The vapor phase emitter pouches used were designated 1-MUL, also available from Cortec Corporation.

The parts were retained in the bags for at least 24 hours after which they were removed for environmental testing. The results of tests on this group of parts is depicted in Table 1 below as Group 2 along with the variables used in developing the Eyring Acceleration Model used to arrive at the expected survival rate.

Group 3:

A third group of the parts (designated as Group 3) was maintained as a control group. The parts in the control group were cleaned by aqueous washing as described above for Group 1. The parts were then subjected to environmental testing. The results of tests on this group of parts is depicted in Table 1 below as Group 3 along with the variables used in developing the Eyring Acceleration Model used to arrive at the expected survival rate.

TABLE 1

| Group | A | ΔH | B | Scale | Shape | Years |
|---|---|---|---|---|---|---|
| 1 | −9.3 | .72 | −10.9 | 61 | 1.61 | 9.6 |
| 2 | −4.4 | .48 | −5.5 | 14 | 3.44 | 6.8 |
| 3 | −17.2 | .80 | −7.0 | 4 | 1.35 | 0.4 |

Corrosion Testing of Groups 1–3

The different groups of parts prepared as described above were then placed in environmental testing chambers and subjected to controlled conditions to collect the data needed to develop an Eyring Acceleration Model for each group.

The tests were conducted by placing the parts in an environmental testing chamber in which both temperature and humidity could be controlled. The data collected was used to develop an Eyring Acceleration Model of the expected life of representative plain carbon steel parts having a primary coating and vapor corrosion inhibiting layer, as well as control groups of parts having no additional vapor corrosion inhibiting layer. For the purposes of the tests, 0.049" (1.24 mm) in any direction on the surface of the material was established as the maximum size for a defect with corrosion, at which point the part was determined to have reach the point of failure.

Figure 5:
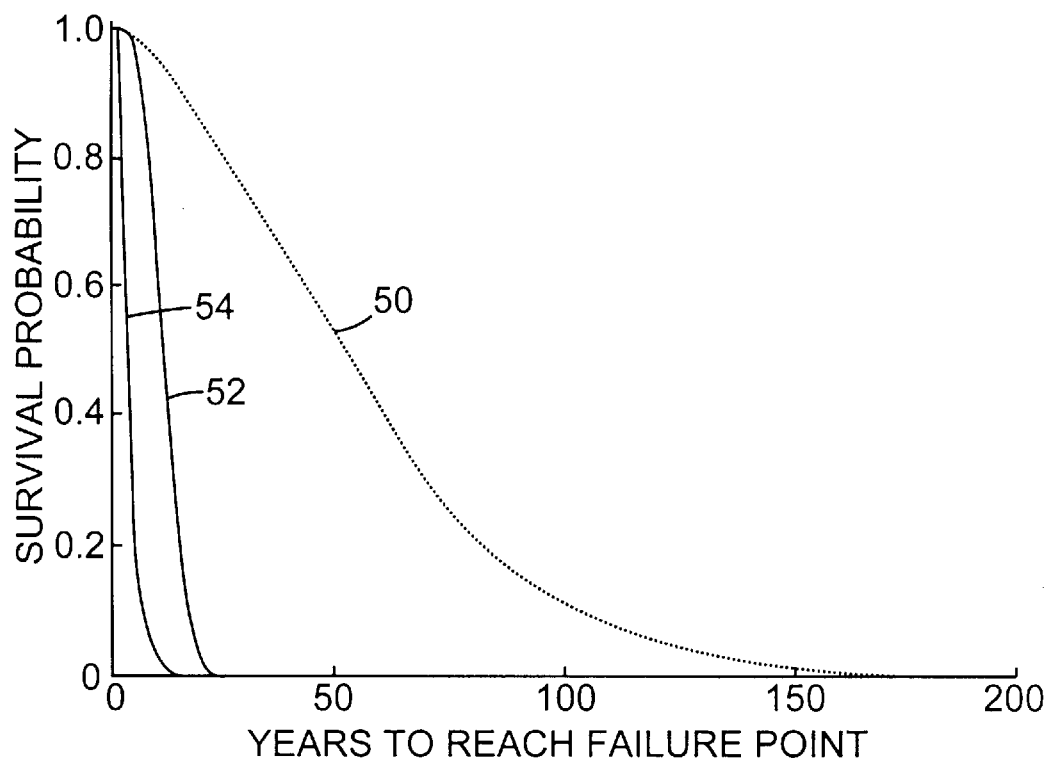
FIG. 5 is a graph of the results of corrosion testing of coated plain carbon steels that could be used to manufacture shutters according to the present invention.

The results of the corrosion testing for conditions of a temperature of 25° C. and 50% Relative Humidity are depicted in Table 1 and in FIG. 5. They show the improvements in expected survival of parts manufactured with a vapor corrosion inhibitor according to the present invention. The results shown in the years column of Table 1 are the point at which 5% of the parts can be expected to have developed defects having the size of 0.049 inches (1.24 mm). This is also the point at which 95% of the parts can be expected to have survived, i.e., the surviving parts would not have developed defects having a size of 0.049 inches (1.24 mm). FIG. 5 is a graphical representation of the results of the Eyring Acceleration Model including a curve 50 for Group 1, curve 52 for Group 2, and curve 54 for Group 3.

Various modifications and alterations of this invention will become apparent to those skilled in the art without departing from the scope of this invention, and it should be understood that this invention is not to be unduly limited to the illustrative embodiments set forth herein.

What is claimed is:

1. A protective shutter for a data storage disc cartridge comprising:
   a) a core of plain carbon steel;
   b) a primary coating on at least a portion of the core; and
   c) a vapor corrosion inhibiting layer on the primary coating.

2. A shutter according to claim 1, wherein the vapor corrosion inhibiting layer comprises an amine.

3. A shutter according to claim 1, wherein the primary coating comprises a metallic plating.

4. A shutter according to claim 1, wherein the plain carbon steel comprises a plain carbon steel having 0.2% or less carbon.

5. A data storage disc cartridge comprising a protective shutter, the protective shutter comprising
   a) a core of plain carbon steel;
   b) a primary coating on at least a portion of the core; and
   c) a vapor corrosion inhibiting layer on the primary coating.

6. A cartridge according to claim 5, wherein the vapor corrosion inhibiting layer comprises an amine.

7. A cartridge according to claim 5, wherein the primary coating comprises a metallic plating.

8. A data storage disc cartridge according to claim 5, wherein the shutter comprises two opposing sides, each of the two opposing sides connected along a bend having a fillet radius of about 1 mm or greater.

9. A method of manufacturing a protective shutter for a data storage cartridge comprising steps of:
   a) providing a shutter core of plain carbon steel;
   b) providing a primary coating on the shutter core; and
   c) providing a vapor corrosion inhibiting layer on the primary coating.

10. A method according to claim 9, wherein the step of providing the shutter core comprises stamping and forming the shutter core from a sheet of plain carbon steel.

11. A method according to claim 10, wherein the primary coating is provided on the sheet of plain carbon steel before stamping.

12. A method according to claim 9, wherein the step of providing the vapor corrosion inhibiting layer comprises applying the vapor corrosion inhibiting layer in an aqueous solution.

13. A method according to claim 9, wherein the step of providing the vapor =corrosion inhibiting layer comprises positioning the shutter core in an environment containing the material of the vapor corrosion inhibiting layer in vapor phase.

14. A method according to claim 9, wherein the step of providing the vapor corrosion inhibiting layer comprises the steps of:
   1) applying the vapor corrosion inhibiting layer in an aqueous solution; and
   2) locating the shutter core in an environment containing the material of the vapor corrosion inhibiting layer in vapor phase.

15. A method of manufacturing a protective shutter for a micro-floppy magnetic data storage disc comprising steps of:
   a) providing a shutter core of plain carbon steel;
   b) providing a primary coating on the shutter core; and
   c) providing a vapor corrosion inhibiting layer on the primary coating.

16. A method according to claim 15, wherein the step of providing the vapor corrosion inhibiting layer comprises applying the vapor corrosion inhibiting layer in an aqueous solution.

17. A method according to claim 15, wherein the step of providing the vapor corrosion inhibiting layer comprises positioning the shutter core in an environment containing the material of the vapor corrosion inhibiting layer in vapor phase.

18. A method according to claim 15, wherein the step of providing the vapor corrosion inhibiting layer comprises the steps of:
   1) applying the vapor corrosion inhibiting layer in an aqueous solution; and
   2) locating the shutter core in an environment containing the material of the vapor corrosion inhibiting layer in vapor phase.

19. A method according to claim 15, wherein the step of providing the shutter core comprises forming the shutter core with two opposing sides connected along two bends, wherein a fillet radius of the bends is about 1 millimeter or greater.

20. A cartridge according to claim 5, wherein the plain carbon steel comprises a plain carbon steel having 0.2% or less carbon.

21. A cartridge according to claim 5, wherein the data storage disc cartridge is a micro-floppy magnetic data storage disc cartridge.

22. A shutter according to claim 1, wherein the data storage disc cartridge is a micro-floppy magnetic data storage disc cartridge.

23. A shutter according to claim 1, wherein the shutter comprises two opposing sides, each of the two opposing sides connected along a bend having a fillet radius of about 1 mm or greater.

* * * * *